Patented June 16, 1953

2,642,410

UNITED STATES PATENT OFFICE 2,642,410

POLYMERIZATION IN THE PRESENCE OF ORGANIC HYDROPEROXIDE AND METAL SALT DRIER

Harold A. Hoppens, Toledo, Ohio, assignor to Libbey-Owens-Ford Glass Company, Toledo, Ohio, a corporation of Ohio No Drawing. Application February 24, 1947, Serial No. 730,547

6 Claims. (Cl. 260—45.4)

The invention relates to an improvement in the control of the polymerization of olefinic double bonds.

The polymerization of molecules that contain olefinic double bonds, i. e., the "addition" polymerization which takes place at the double bond in polymerizable substances containing olefinic double bonds, is accelerated by various agencies such as heat, actinic light and certain chemical compounds having a catalytic effect on the polymerization. Chemical compounds that have been used as catalysts include inorganic peroxides such as sodium peroxide and hydrogen peroxide, and organic peroxides such as benzoyl peroxide and acetyl peroxide. The organic peroxides have been used most commonly as catalysts, particularly in bulk polymerization, since they are soluble in the monomeric forms of the substances to be polymerized. Benzoyl peroxide is generally recognized as the most effective catalyst of the organic peroxides.

A serious practical disadvantage in the use of an organic peroxide catalyst is that the rate of polymerization cannot be controlled satisfactorily. Little or no catalytic effect is shown by an organic peroxide at relatively low temperatures and the effect does not increase appreciably as the temperature is raised until a critical temperature is reached at which a sudden pronounced catalytic effect causes polymerization to take place almost violently. A gradual increase in the rate of polymerization cannot be obtained by a gradual increase in temperature approaching the critical temperature. This "trigger action" of organic peroxides, which is particularly apparent in the polymerization of a mixture of a polymerizable unsaturated polyester and a monomeric allyl ester, causes a substance to be very rapidly polymerized (with the evolution of a great amount of heat) from a monomer or a very low polymer to a completely polymerized product and, consequently, results in many defects in the final product such as small bubbles, cracks and general discoloration. In order to prevent the formation of these defects, it has been found that it is necessary to carry out initial polymerization at a very slow rate to form a preliminary polymer or gel and then, if desirable, to complete the polymerization at a rapid rate by the use of any of the known accelerating agencies. Because of the difficulty in controlling the catalytic effect of an organic peroxide, it is necessary to warm the substance to be polymerized (in the presence of the organic peroxide) with great care and to keep the substance warm for an unreasonably long period of time in order to produce a preliminary polymer or gel which can be polymerized or cured to give a final product free from defects. The necessity for the use of such a long period of time for initial polymerization has many industrial and economic disadvantages.

The principal object of the invention is to provide rapid, controllable polymerization of molecules that contain olefinic double bonds. More specific objects and advantages are apparent from the description, which merely discloses and illustrates the invention and is not intended to impose limitations upon the claims.

An organic hydroperoxide, such as tetralin hydroperoxide, has been considered unsatisfactory for use as a catalyst. Although its catalytic behavior is similar to that of an organic peroxide, it has been shown to have a much weaker catalytic effect than an organic peroxide and to cause incomplete curing of the final product. For example, about fifty parts of tetralin hydroperoxide are required to produce the same catalytic effect as one part of benzoyl peroxide in the polymerization of methyl methacrylate. Therefore when an organic hydroperoxide is employed alone in place of an organic peroxide as a catalyst, the polymerization is much slower and also the final polymerization product is not hardened to the proper extent.

The name "metallic drier" has been given to a certain type of substance because that type of substance promotes the action of air upon a drying oil. When a drying oil is exposed to the air, the air has a catalytic effect upon the drying oil in that it causes the surface of the oil to "dry," probably by polymerization. A metallic drier promotes this catalytic effect of air. It is known that the polymerization of most molecules that contain olefinic double bonds is inhibited by air and therefore, since a metallic drier merely promotes the effect of air (upon a drying oil), a metallic drier alone in the absence of air has no appreciable catalytic effect and in the presence of air would be expected to have the general function of an inhibitor and to be unsuitable as a catalyst for the polymerization of most molecules that contain olefinic double bonds.

In the practice of the invention, the polymerization of molecules that contain olefinic double bonds is controlled by carrying out the polymerization in the presence of an organic hydroperoxide and a metallic drier selected from the class consisting of cobalt (Co), manganese (Mn), copper (Cu), iron (Fe), chromium (Cr), calcium (Ca), nickel (Ni) and lead (Pb) driers. It has been discovered that by the use of a catalyst combination of the invention (i. e., comprising an organic hydroperoxide and one of the foregoing metallic driers) the initial polymerization of molecules that contain olefinic double bonds can be controlled so as to be slow enough to prevent formation of defects in the final product and yet rapid enough to be commercially and economically practicable. In fact, by the use of the catalyst combination of the invention for the polymerization of molecules that contain olefinic double bonds the resulting catalytic effect may be not only so great at ordinary temperatures that an initial polymerization (which would require two or more days with the use of benzoyl peroxide) can be carried out to form a gel in less than an hour, but also sufficiently great at higher temperatures to produce final products of satisfactory hardness. The action of the metallic drier in this combination is entirely apart from its usual function of promoting the effect of air, because the catalytic action of this combination takes place either in the absence or in the presence of air.

The present invention is applicable to the polymerization of all polymerizable molecules that contain olefinic double bonds. A substance containing one or a plurality of polymerizable olefinic double bonds in the molecule may be polymerized in accordance with the present invention.

The invention is particularly applicable to polymerizable acrylic compounds. Such acrylic compounds include acrylic acid; its homologues such as methacrylic, ethacrylic, alpha-ethyl acrylic, alpha-chloro acrylic and alpha-beta-dimethyl acrylic acids; and derivatives thereof such as anhydrides, amides, nitriles, and esters of alcohols such as methyl, ethyl, propyl, butyl, isobutyl, amyl, hexyl, cyclohexyl, cyclohexyl-cyclohexyl, heptyl, octyl and decyl alcohols, nitro alcohols such as 3-nitro-2-butanol, 2-nitro-3-hexanol, 2-methl-2-nitro-1-butanol and 2-nitro-2-methyl propyl alcohols, and dihydric alcohols such as glycol.

The invention is applicable also to the polymerization of substances known as "vinyl compounds," which include ketones such as methyl vinyl ketone, methyl isopropenyl ketone, ethyl vinyl ketone, propyl vinyl ketone and phenyl vinyl ketone; vinyl carboxylates such as vinyl formate, vinyl acetate, vinyl chloroacetate, vinyl propionate, vinyl bromopropionate and vinyl stearate; vinyl halides such as vinyl chloride and vinyl bromide; styrenes such as styrene, o-methyl styrene, p-methyl styrene, m-methyl styrene, 2,4-dimethyl styrene, 2,4,5-trimethyl styrene, p-ethyl styrene, o-bromoethyl styrene, p-isopropyl styrene, p-chloro-styrene and 2,4-dichlorostyrene; and heterocyclic vinyl compounds such as vinyl carbazole, vinyl phthalimide and vinyl pyrrolidone.

The invention is applicable also to the polymerization of molecules that contain olefinic double bonds contained in substances which in their polymerized form are generally referred to as "elastomers." Such substances include butadiene, isoprene, vinylcyanide and haloprenes such as chloroprene. In the preparation of an elastomer the foregoing substances usually are copolymerized with one another or with certain other substances containing polymerizable olefinic double bonds such as styrene.

Molecules that contain olefinic double bonds which may be polymerized in the practice of the invention also may be contained in radicals of unsaturated dibasic acids such as maleic, fumeric, itaconic, citraconic, or mesaconic acid or in other unsaturated radicals, such as allyl or crotyl radicals. These unsaturated radicals may be connected directly to carbon atoms in the molecule or may be connected to the rest of the molecule by ester, ether or amide linkages.

The term "polymerizable olefinic double bond," as used herein, includes not only a double bond (at which addition polymerization takes place) in a substance whose molecules can be polymerized alone, but also a double bond in a substance whose molecules cannot be polymerized alone but can be copolymerized with other molecules which may or may not be capable of polymerization alone. Examples of such copolymerization include the copolymerization of maleic anhydride (which does not polymerize alone) with a mono-allyl or a mono-methallyl ester (which does not readily polymerize alone) such as allyl acetate, allyl propionate, allyl chloroacetate, allyl alpha-chloropropionate, allyl caproate, allyl levulinate, allyl benzoylbenzoate, allyl benzoate, methallyl acetate, allyl laurate, allyl stearate, allyl esters of linseed fatty acids, allyl myristate, allyl undecylenate and allyl cyanoacetate; the copolymerization of maleic anhydride with allyl ethers such as allyl benzene ether, allyl t-butyl ether, allyl ethyl ether, allyl phenyl ether and glycerol alpha-allyl ether; the copolymerization of maleic anhydride with mono-allyl ketones such as allyl methyl ketone, allyl ethyl ketone, 2-chloro allyl methyl ketone and allyl acetone; and the copolymerization of maleic anhydride with vinyl compounds such as vinyl propyl succinate, vinyl butyl phthalate, vinyl diethyl citrate, styrene and stilbene.

The invention is applicable also to the polymerization of polymerizable allyl esters, such as an ester or mixed ester of two alcohol molecules, each consisting of a molecule of allyl, crotyl, alpha-methyl allyl, methallyl, beta-chloro allyl or beta-methyl crotyl alcohol, with a molecule of a dibasic acid.

Another polymerizable allyl ester that may be polymerized in accordance with the invention consists of an ester of two substances that will be described, one of which has a carboxy group and the other of which has an alcoholic hydroxy group.

The substance having a carboxy group may have the general formula F—OH, in which F is the acid radical of acrylic, methacrylic or alpha-chloracrylic acid, or may have the general formula R—O—D—O—H, in which R is an alcohol radical such as a methyl, ethyl, n-propyl, isopropyl, n-butyl, isobutyl, secondary butyl or tertiary butyl radical, and D is the divalent acid radical of a dibasic acid such as maleic, chloromaleic, bromomaleic, fumaric, chlorofumaric, bromofumaric, mesaconic or citraconic acid. When R in the latter general formula is an allyl, crotyl, alpha-methyl allyl, methailyl, beta-chloro allyl or beta-methyl crotyl radical, D may be the divalent acid radical of any saturated dibasic acid in the series from carbonic, oxalic and malonic acids to sebacic acid.

The substance having an alcoholic hydroxy group may consist of a compound having the general formula

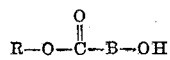

in which R is the monovalent hydrocarbon radical or monovalent chlorinated hydrocarbon radical of any of the unsaturated alcohols hereinbefore mentioned, and in which B is methylene, methyl methylene, or any phenylene radical. The substance having an alcoholic hydroxy group may also consist of a compound having the general formula R—O—D—O—E—OH in which D is the divalent acid radical of any of the saturated or unsaturated dibasic acids hereinbefore mentioned, R has the same significance as in the preceding general formula and E is the divalent radical of any dihydroxy compound in the series from ethylene glycol to octa-methylene glycol, any polyethylene glycol in the series from diethyl glycol to tetra-ethylene glycol or o-, m- or p-dihydroxy benzene.

Such an allyl ester thus has the general formula

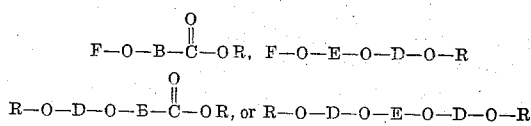

Another allyl ester that may be polymerized in accordance with the invention consists of an ester of a molecule of any of the dibasic acids hereinbefore mentioned with two similar molecules (or a mixed ester of a molecule of such a dibasic acid with two dissimilar molecules) each of which is an ester of glycolic, lactic or o-, m- or p-hydroxy benzoic acid with any of the unsaturated alcohols hereinbefore mentioned. Such an allyl ester has the general formula

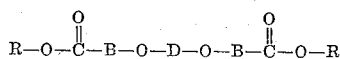

Still another allyl ester that may be polymerized in accordance with the invention consists of an ether of two similar or dissimilar molecules each consisting of an ester of glycolic, lactic or o-, m-, or p-hydroxy benzoic acid with any of the unsaturated alcohols hereinbefore mentioned. Such an allyl ester has the general formula

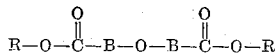

Yet another allyl ester that may be polymerized in accordance with the invention consists of an ether of a molecule of ethylene glycol, propylene glycol, 1,2-butylene glycol, 2,3-butylene glycol or o-, m-, or p-dihydroxy benzene with two similar or dissimilar molecules each consisting of an ester of glycolic, lactic or o-, m-, or p-hydroxy benzoic acid with any of the unsaturated alcohols hereinbefore mentioned. Such an allyl ester has the general formula

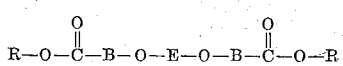

The invention is particularly applicable to the polymerization of a polymerizable unsaturated polyhydric alcohol-polycarboxylic acid polyester, which is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity. Ordinarily it is desirable that the unsaturated polyester be polymerizable into an infusible or high melting point resin, so that the proportion of unsaturated components should be such that the polyester contains an average of more than one double bond per molecule; for example, there may be an average of eleven or more double bonds in every ten molecules of the polyester.

The present invention is applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylene, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol butantetrol-1,2,3,4, a trihydroxy normal alkane having from four to five carbon atoms such as butantriol-1,2,3 or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. It is desirable to exclude oxygen, which causes discoloration.

Polymerization of these materials usually is carried out at temperatures of about 160° to about 180° F. A solution comprising one or more polymerizable unsaturated polyesters and one or more polymerizable monomeric allyl esters hereinbefore described is particularly useful. Either the unsaturated polyester or the allyl ester or both may be partially polymerized before the ingredients are mixed. Allyl esters that are useful for the preparation of such a solution include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate. Such a solution, which usually contains about 20 to 30 per cent of the allyl ester and about 70 to 80 per cent of the polymerizable polyester, is particularly advantageous because the polyester has desirable physical properties and hardens very rapidly after the initial polymerization whereas the presence of the allyl ester causes the polymerized product to be much more water resistant and insoluble. Moreover, the combination of the polyester and the allyl ester usually polymerizes more rapidly than either of such substances alone. (The terms "parts" and "per cent," as used herein to refer to quantities of material, mean parts and per cent by weight).

A similar solution may be prepared by dissolving the polyester, before use, in a polymerizable substance such as styrene, vinyl acetate, methyl methacrylate or methyl acrylate.

In the preparation of any of the polymerizable substances containing olefinic double bonds, it may be desirable to use an inhibiting agent to reduce premature polymerization, particularly in the preparation of the polymerizable unsaturated polyesters described above.

The presence of an inhibitor may be desirable also to cause an olefinic substance, such as a polymerizable unsaturated polyester, to remain stable during storage or shipment. Although an inhibitor when present in the substance stabilizes the substance during storage, the substance may be polymerized without difficulty upon addition of the catalyst combination of the invention. Whenever added, an inhibiting agent is used in the proportion required to give the desired degree of inhibiting effect. It may be necessary to use different inhibitors in widely different proportions in order to secure the same inhibiting effect. Any desired anti-oxidant such as hydroquinone, pyrogallol, tannic acid or any aromatic amine, such as aniline or phenylene diamine, may be employed as an inhibitor.

Any organic hydroperoxide may be used with a metallic drier hereinbefore described in the catalyst combination of the invention. Organic hydroperoxides (i. e., alkyl or cycloalkyl hydroperoxides) that are useful in such a catalyst combination include the more commonly known hydroperoxides such as tetralin hydroperoxide, 1-hydroxy-cyclopentyl - hydroperoxide - 1, 1 - hydroxy-cyclohexyl-hydroperoxide-1, 1 - hydroxy-cycloheptyl-hydroperoxide-1,1 - hydroxy - cyclooctyl-hydroperoxide-1 and tertiary-butyl hydroperoxide, and mixtures of organic hydroperoxides, such as a commercial mixture of hydroperoxides having an average molecular weight of 130 and having the general formula R—O—O—H in which R is a hydrocarbon radical (Uniperox 60). Such a mixture of hydroperoxides may be obtained by bubbling oxygen through a petroleum fraction during irradiation by ultra-violet light.

Although the peculiar catalytic behavior hereinbefore described is characteristic of any organic hydroperoxide used in the catalyst combination, it has been discovered that certain organic hydroperoxides are particularly outstanding with respect to such behavior. For example, 1 - hydroxy - cyclohexyl - hydroperoxide-1, when used in the catalyst combination, gives at most temperatures a much stronger catalytic effect than other organic hydroperoxides; on the other hand, alkyl hydroperoxides such as tertiary butyl hydroperoxide, when used in the catalyst combination, give a much harder final product than other organic hydroperoxides when the catalyst combination is used to obtain a final cure in molding. If a volatile solvent is used to dissolve a solid organic hydroperoxide such as 1-hydroxy-cyclohexyl-hydroperoxide-1 or if a comparatively volatile liquid organic hydroperoxide such as tertiary butyl-hydroperoxide is used, it may be necessary at higher temperatures to maintain pressure on the material which is being polymerized. The selection of an organic hydroperoxide or a mixture of organic hydroperoxides for use in any particular application of the invention depends upon the catalytic properties and physical properties desired.

The metallic drier (cobalt, iron, copper, manganese, chromium, calcium, nickel or lead drier or a mixture thereof) used in the practice of the invention is preferably a naphthenate salt. However, it is permissible to employ any other salt of the metals listed above that is soluble in the composition containing the substance to be polymerized, e. g., a resinate, linoleate or other salt of an unsaturated fatty acid, or a mixture of such salts. Since the essential function of the acid radical in a metallic drier is to get the metal into solution, it may be desirable in certain cases to use salts which are more soluble than the naphthenate in a particular composition, for example, cobalt acetyl-acetonate in the case of diallyl phthalate (monomer).

The proportions of the organic hydroperoxide and the metallic drier may be varied greatly to obtain the desired catalytic effect, which depends also upon such factors as the particular substance to be polymerized, the temperature and the amount of the catalyst combination used. In the catalyst combination the ratio of organic hydroperoxide to metallic drier may range from the minimum amount of metallic drier which gives an appreciable effect to the maximum amount above which no appreciable increase in effect can be obtained.

In the case of cobalt driers, the ratio of the weight of cobalt (contained in the drier) to the weight of organic hydroperoxide may range from about 1:1000, for most practical purposes, to about 1:10, above which there is no appreciable increase in the catalytic effect. However, in certain instances, when time is not an important factor, it may be desirable to use extremely small amounts of a cobalt drier in the catalyst combination since even a trace of cobalt gives a noticeable effect. A cobalt drier is generally preferred for use in the practice of the invention since its effect is much stronger than that of any of the other driers. The optimum effect from a cobalt drier is obtained when the ratio of cobalt (contained in the drier) to organic hydroperoxide is within the range from about 1:100 to about 1:50. Generally speaking, the most efficiently controlled polymerization may be carried out using a catalyst combination having a ratio of about 1:80. It may be desirable to use other metallic driers or mixtures thereof with one another or with a cobalt drier for special purposes, for example, a colorless drier such as a calcium salt. In the case of the other driers which may be used in the practice of the invention, the ratio of metal (i. e., manganese, copper, iron, chromium, calcium, nickel, or lead contained in the drier) to organic hydroperoxide may range from about 1:1000, for practical purposes, to about 1:5, since the effect of such driers is not quite as strong as that of a cobalt drier. The preferred range in which the maximum benefit is obtained from such driers is approximately the same as that for a cobalt drier (i. e., about 1:100 to about 1:50) and the best results are obtained at approximately the same ratio at which the best results are obtained in the use of a cobalt drier (i. e., about 1:80).

The proportion of the catalyst combination in the substance to be polymerized may range, as the term "catalyst" implies, from the maximum amount of material which may still be considered a catalyst, i. e., about 5 per cent of the substance to be polymerized, to a mere appreciable amount, for example, about 0.01 per cent of the substance to be polymerized. The actual amount of the catalyst combination used to obtain a desired result under any particular circumstances depends also upon other factors referred to hereinbefore. For example, in a laminating process the best results are obtained when the proportions of the catalyst combination is within the range from about 2 per cent to about 0.1 per cent of the substance to be polymerized, and the most desirable results are generally obtained by using about 1 per cent of the substance to be polymerized. On the other hand, in casting or bulk polymerization processes in which it is usually preferable to use smaller amounts of catalyst a preferred range is from about 1 per cent to about 0.05 per cent of the substance to be polymerized, although in certain cases, hereinbefore mentioned, when time is not an important factor it may be desirable to use even less of the catalyst combination. About 0.5 per cent of the subtsance to be polymerized is generally found to give the best results.

The organic hydroperoxide and the metallic drier to be used in the catalyst combination may be incorporated into a composition containing the substance to be polymerized, separately or together, by any of the known methods. For example, in bulk polymerization, the organic hydroperoxide and the metallic drier may be dissolved directly in the monomeric form of the substance to be polymerized or they may be dissolved in different solvents or a mutual solvent and then dissolved in the substance to be polymerized or a solution thereof. If desirable, also, the catalyst combination may be used in emulsion polymerization according to any of the usual procedures.

In the practice of the invention, the temperature which may be employed ranges from as high as the decomposition temperature of the resin to as low as about room temperature, which is considered the lower limit of the range for most practical purposes, although there is no real lower limit and polymerization may be carried out at temperatures lower than room temperature, if desired. The polymerization ordinarily proceeds at a controllable rate and at a sufficiently rapid rate for most purposes at room temperature. However, the rate of polymerization may be controlled easily by changes in temperature and may be increased gradually by increases in temperature up to about 90° F. Temperatures above 90° F., except when very small amounts of the catalyst combination are used, generally give a very rapid rate of polymerization which may be too rapid for initial polymerization. Since the rate of polymerization may be controlled also by changes in such factors as the amount and composition of the catalyst combination used, usually any desired rate may be obtained at room temperature, which is the most economical temperature.

After the initial polymerization the rate of polymerization may be increased to a very rapid rate to bring about complete polymerization, i. e., a final cure. Such final cure may be brought about rapidly by simply increasing the temperature with or without the addition of more or another catalytic agent. Preferably, however, an organic peroxide is used and also the temperature is increased in order to obtain a more rapid final cure and a final product harder than the product usually obtained through the use of the catalyst combination alone.

Since an organic peroxide is added also as a catalyst, it may be added in the same amounts as the catalyst combination hereinbefore described. The optimum amount of organic peroxide to be added is equal to about 2 per cent of the substance to be polymerized. An organic peroxide or a solution thereof may be added (e. g., by dissolving it in the substance to be polymerized) before or after the initial polymerization. If an organic peroxide is added to the composition (containing the substance to be polymerized) before initial polymerization, the initial polymerization must be carried out at a temperature below the critical temperature at which the "trigger action" of such organic peroxide takes place. Also, an organic peroxide may be milled into the composition, after the initial polymerization, on a two-roll (differential speed) rubber mill, or a dilute solution of an organic peroxide may be sprayed or brushed onto thin sheets of material containing the composition, for example, sheets of a laminating material impregnated with a binder which has been initially polymerized according to the invention. On the other hand, in certain commercial laminating procedures in which an organic peroxide has been mixed previously with the binder and the sheets of laminating material have been impregnated with the binder, a dilute solution of the catalyst combination of the invention may be sprayed or brushed onto the impregnated sheets in order to carry out the initial polymerization before the impregnated sheets are subjected to the pressure and temperature necessary for a final cure.

The preferred organic peroxide for use with the catalyst combination in the practice of the invention is benzoyl peroxide, but any other organic peroxide such as succinyl peroxide, acetyl peroxide, peracetic acid, perbenzoic acid, toluyl peroxide, p-brombenzoyl peroxide, anisoyl peroxide, chloroacetyl peroxide or furoyl peroxide or any organic ozonide, such as diisopropylene ozonide or diisobutylene ozonide, or a mixture of such substances, may be used as the secondary curing catalyst.

The invention has many applications in the synthetic resin field. For example, by the use of the invention in preparing a laminating composition or filled molding composition the binder is initially polymerized to a gel at room temperature so that full pressure may be applied to the stacked impregnated sheets or the impregnated filler without danger of squeezing the binder out. In these cases the catalyst combination may be used to controllably polymerize the material up to a non-tacky stage just short of the infusible stage and thereby greatly reduce the length of time in the curing cycle and particularly in the use of materials such as diallyl phthalate, greatly reduce the amount of heat given off during curing. In casting or bulk polymerization the catalyst combination may be used to initially polymerize the substance to a gel which can be rapidly cured to give greatly improved final products. In foaming processes, to which the invention is particularly applicable, the catalyst combination may be used to rapidly polymerize the substance which is foamed (i. e. to "set" the foam) at room temperature.

EXAMPLE 1

An organic hydroperoxide-metallic drier catalyst combination is used for the polymerization of one or more polymerizable esters, for example, a mixture of a polymerizable unsaturated polyhydric alcohol-polycarboxylic acid polyester and an allyl ester, obtained as follows: A charge consisting of 1.5 mols of maleic anhydride, 1.6 mols of diethylene glycol and an amount of hydroquinone equal to 0.02 per cent of the charge is put into a three-necked flask. The flask is fitted with a thermometer, a tube leading to a condenser and an inlet tube through which is introduced a moderate stream of carbon dioxide, and is heated in an oil bath to a temperature of 220° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 5 hours at such temperature, a polyester is obtained in the form of a moderately stiff liquid having an acid number of 18. Mixing 30 parts of diallyl phthalate with 70 parts of the polyester so prepared gives a liquid of syrup-like consistency.

A charge consisting of 25 grams of the mixture described above and an organic hydroperoxide, and a charge consisting of 25 grams of said mixture, an organic hydroperoxide and a cobalt drier containing an amount of colbalt (Co) equal to 0.012 per cent of the charge are put into separate 50 cc. Pyrex beakers at room temperature (75° F.). The cobalt drier employed is cobalt naphthenate in a commercial mineral spirits solution, which contains 6 per cent of cobalt. A glass rod is used to stir each charge carefully (so as to stir as little air as possible into the composition) until the catalytic material is completely stirred into the mixture to form a homogeneous liquid. The length of time required at room temperature for initial polymerization to the gel stage, i. e., the gel time, is determined by a liquid life test in which the glass stirring rod is withdrawn from the material at regular intervals in order to determine the point at which the material changes from its original syrup-like consistency to a gel-like consistency and adheres tenaciously to the glass rod to form a non-flowing, partially elastic string when the glass rod is withdrawn. The liquid life or gel time is the length of time required for the material to increase in viscosity to the point described, measured from the time when the hydroperoxide and the drier are stirred into the charge.

Table 1 (below) shows the gel time of materials so prepared and more specifically describes the composition of the charges by specifying the type of organic hydroperoxide and the form in which the hydroperoxide is added (column 1), the per cent of organic hydroperoxide in the charge (column 2) the gel time in hours when the organic hydroperoxide is used alone, i. e., without the drier (column 3) and the gel time in hours when both the organic hydroperoxide and the drier are used (column 4). For the sake of comparison, the gel times for materials prepared as described in the preceding paragraph except that an organic peroxide (benzoyl peroxide) is used in place of the organic hydroperoxide are shown in Table 1 (line 1).

*Table 1*

| Type and form of the hydroperoxide (or peroxide) | Percent Hydroperoxide in charge | Gel time (hours), no drier added | Gel time (hours), drier added |
| --- | --- | --- | --- |
| Benzoyl Peroxide in paste containing equal weight of tricresyl phosphate | [1] 2.0 | 10 | 10 |
| 1-Hydroxy-Cyclohexyl-Hydroperoxide-1 solid (100%) | 1.1 | 60 | ½ |
| 60% solution of Tertiary-Butyl Hydroperoxide in mineral spirits | 0.7 | 36 | 12 |
| 60% solution of Hydrocarbon Hydroperoxide Mixture [2] in mineral spirits | 1.1 | 36 | 2 |
| 16.4% solution of Tetralin Hydroperoxide in tetralin [3] | 0.3 | ---- | [4] 11 |

[1] Percent peroxide.
[2] Uniperox 60: General formula is R—O—O—H; average molecular weight is 130; R is hydrocarbon radical; 12.3% active oxygen in the solution.
[3] Obtained by passing oxygen through tetralin exposed to ultraviolet light, for eight hours at room temperature.
[4] Used cobalt drier containing an amount of cobalt (Co) equal to 0.02% instead of 0.012% of the charge.

If the drier used is another cobalt drier hereinbefore mentioned that is equally soluble in the mixture prepared as described in the example, e. g. cobalt acetylacetonate, substantially the same results are obtained. However, the rate of polymerization may be changed by changes in the amount of cobalt drier used. For example, a procedure is carried out that is the same as the foregoing except that the organic hydroperoxide used is 1-hydroxy-cyclohexyl-hydroperoxide-1 in an amount equal to 1 per cent of the charge and the amount of cobalt drier is such that separate charges contain 0.1, 0.05, 0.001, and 0.0001 per cent of cobalt (Co), respectively. The gel times for the materials containing 0.1 and 0.05 per cent cobalt (Co) are substantially the same as that for the material containing 0.012 per cent cobalt (Co) shown in Table 1 (line 2), while the gel time for the material containing 0.001 per cent cobalt (Co) is 5 hours and that for the material containing 0.0001 per cent cobalt (Co) is 12 hours.

A molding composition is prepared by thoroughly mixing in a Banbury mixer a charge consisting of 55 parts of asbestos, 45 parts of the mixture prepared as described in the first paragraph of the example, a cobalt drier containing an amount of the cobalt (Co) equal to 0.012 per cent of the charge, and an amount of the solution of hydrocarbon hydroperoxides described in Table 1 (line 4) equal to 1 per cent of the charge. A small bar (½" x ⅜" x 1") is produced by molding the material under a pressure of 5000 pounds per square inch for two minutes in a mold heated with steam at 75 pounds gauge pressure. In standard physical tests, such as a compressive strength test, the molded bar gives results substantially the same as a molded bar which is produced in the same manner except that benzoyl peroxide is used instead of the organic hydroperoxide and the drier. If the polymerizable ester mixture (in the molding composition) is initially polymerized to the gel stage (e. g. by allowing the composition to stand at room temperature for a few hours), the molding time, temperature or pressure may be reduced without substantially affecting the properties of the final product. Substantially the same results are obtained if the same procedure is repeated using tertiary-butyl hydroperoxide instead of the hydrocarbon hydroperoxide solution.

EXAMPLE 2

A metallic drier other than a cobalt drier is used with an organic hydroperoxide for the polymerization of molecules that contain olefinic double bonds, for example by carrying out a procedure that is the same as that given in the second paragraph of Example 1 except that a metallic drier containing an amount of metal equal to 0.012 per cent of the charge, and an amount of organic hydroperoxide (1-hydroxy-cyclohexyl-hydroperoxide-1) equal to 1 per cent of the charge are used and the samples are allowed to stand at room temperature for 24 hours after the hydroperoxide and drier are stirred into the charge to form a homogeneous (liquid) material. The various commercial solutions of metallic naphthenates in mineral spirits which are used are of different concentrations, and the amount of each solution used contains an amount of metal equal to 0.012 per cent of the charge.

Table 2 (below) shows the gel time of materials so prepared and more specifically describes the composition of the charges by specifying the type of metal in the drier (column 1), the per cent of metal in the commercial solution of the drier (column 2) the gel time at room temperature in hours (column 3) and the observed condition of the material after standing 24 hours at room temperature (column 4).

Table 2

| Type of Metal in Drier | Percent Metal in Drier Sol. | Gel Time (hrs. at 75° F.) | Condition of material after standing 24 hours at room temperature |
|---|---|---|---|
| Co | 6.0 | ½ | Very hard throughout, including the surface (reached this condition in 2 hours). |
| Cu | 4.0 | ½ | Hard below surface; soft surface. |
| Mn | 6.0 | 1 | Very hard below surface; soft surface. |
| Fe | 6.0 | 1½ | Do. |
| Ca | 2.5 | 2 | Soft gel. |
| Ni | 4.3 | 2 | Do. |
| Cr | 2.4 | 3 | Soft gel; slightly harder than other soft gels. |
| Pb | 12.0 | 3 | Soft gel. |

A procedure is carried out that is the same as that given in the first paragraph of the example except that, as soon as the hydroperoxide and the drier are stirred into the mixture, each material is spread onto a piece of canvas to form a thin film on the canvas, and the canvas is placed in an oven at 75° C. (having forced air circulation) in order to determine the rate of "surface cure." In the "surface cure" test the canvas is removed from the oven at regular intervals, cooled slightly so that one can touch the film with the finger to determine whether the surface is still tacky (i. e., the surface sticks to the finger) or cured (i. e., tack-free or non-sticky when one presses the finger on the surface as hard as possible). The "surface cure" is the length of time required for the film to become cured.

Table 3 (below) shows the "surface cure" time for films so prepared and more completely describes the test by specifying the type of metal in the drier (column 1), the "surface cure" time in hours and minutes (column 2), the observed condition of the film at an intermediate stage which is designated by the length of time in hours and minutes after the hydroperoxide and the drier are stirred into the mixture (column 3) and the observed condition of the film 20 hours after the hydroperoxide and the drier are stirred into the mixture (column 4). For the sake of comparison, surface cure test results are given for films prepared by procedures which are the same as in the preceding paragraph except that the organic hydroperoxide without a drier is used (line 9) and no organic hydroperoxide or drier is used (line 10).

Table 3

| Type Metal in Drier | Surface Cure Time (hr.—min.) | Condition of film at intermediate stages (hr.—min.) | Condition of film after 20 hours |
|---|---|---|---|
| 1. Co | 0–10 | | Rigid; tack free. |
| 2. Mn | 2–10 | | Do. |
| 3. Cu | | (0–10) tacky; (2–20) still slightly tacky. | Do. |
| 4. Fe | | (0–20) tacky; (2–20) still slightly tacky. | Do. |
| 5. Cr | | (0–30) thickened liquid | Do. |
| 6. Pb | | do | Soft; tack free. |
| 7. Ca | | (0–50) thickened liquid | Do. |
| 8. Ni | | (1–10) thickened liquid | Do. |
| 9. None | | | Tacky. |
| 10. None [1] | | | Liquid. |

[1] Neither drier nor hydroperoxide is present.

A procedure is carried out that is the same as that given in the third paragraph of the example (i. e., the "surface cure" test) except that the temperature of the oven is held at 100° C. The surface cure times are decreased but are still generally in the same relative order for the various types of metals in the driers. For example, a film containing a cobalt drier is cured in 5 minutes, one containing a manganese drier is cured in 35 minutes and one containing a copper drier is cured in 55 minutes.

EXAMPLE 3

An organic hydroperoxide-metallic drier catalyst combination is used for the polymerization of an acrylic compound, for example, methyl methacrylate monomer. A charge consisting of 10 grams of the monomer, an amount of organic hydroperoxide (1-hydroxy-cyclohexyl-hydroperoxide-1) equal to 2 per cent of the charge and a metallic drier (cobalt drier, hereinbefore described) containing an amount of metal equal to 0.02 per cent of the charge is put into a 25 cc. test tube and carefully stirred (as hereinbefore described) until the charge becomes a homogeneous (liquid) material. The material, held at room temperature, becomes a hard solid in 4 days.

The polymerization is accelerated by heat or actinic light. If a material prepared as described in the preceding paragraph is held at 70° C., a non-flowable gel is formed in 16 hours. Also, an increase in the amount of the hydroperoxide or of the drier increases the rate of polymerization.

A procedure is carried out that is the same as that given in the first paragraph of the example except that the metallic drier is not added to the charge. After 4 days at room temperature the resulting substance is a limpid liquid, and apparently very little polymerization takes place in this length of time. If the same procedure is repeated except that the monomer is used alone, i. e., without a hydroperoxide or a drier, and if in still another procedure the monomer is used with an amount of organic peroxide (benzoyl peroxide) equal to 0.01 per cent of the monomer, the resulting materials are also limpid liquids after 4 days at room temperature.

Other acrylic compounds may be polymerized in the same manner, and changes in the type of cobalt drier (i. e., soluble cobalt salt hereinbefore described), in the type of metal used in the drier, or in the type of organic hydroperoxide in the catalyst combination cause variations in catalytic behavior similar to those demonstrated in Examples 1 and 2 and alter the rate of polymerization correspondingly.

EXAMPLE 4

An organic hydroperoxide-metallic drier catalyst combination is used for the polymerization of a vinyl compound, for example, styrene monomer. A procedure is carried out that is the same as that given in the first paragraph of Example 3 except that the monomer is styrene instead of methyl methacrylate. The material, held at room temperature, becomes a hard solid in one week. The same material, held at 70° C. for 24 hours, becomes a very hard solid having a Barcol hardness equal to 22.7.

A procedure is carried out that is the same as that given in the first paragraph of the example except that the metallic drier is not added to the charge. After one week at room temperature the resulting material is a slightly viscous liquid. Apparently, only a small amount of polymerization takes place in this length of time. If the same procedure is repeated except that the monomer is used alone, i. e., without a hydroperoxide or a drier, and if in still another procedure the monomer is used with an amount of organic peroxide (benzoyl peroxide) equal to 0.01 per cent of the monomer, after one week at room temperature the resulting materials are limpid liquids, and after 24 hours at 70° C. the monomer alone is a viscous liquid and the monomer with the organic peroxide is a very soft solid.

EXAMPLE 5

A procedure is carried out that is the same as that given in Example 4 except that the amount of organic hydroperoxide used is equal to 0.1 per cent instead of 2 per cent of the charge and the extent of polymerization is determined by the increase in viscosity. After 48 hours at room temperature the resulting material has a viscosity of 189 seconds (efflux time) according to a standard Ostwald viscometer for hydrocarbon oils. The same material, held at 70° C. for 48 hours, becomes a hard solid.

A procedure is carried out that is the same as that given in the first paragraph of the example except that the monomer is used alone, i. e., without a hydroperoxide or a drier, and in still another procedure, the monomer is used with an amount of organic peroxide (benzoyl peroxide) equal to 0.1 per cent of the monomer. After 48 hours at room temperature the resulting materials have a viscosity of only about 58 seconds (efflux time) according to the Ostwald viscometer.

EXAMPLE 6

A procedure is carried out that is the same as that given in the first paragraph of Example 3 except that the monomer used is vinyl acetate instead of methyl methacrylate. The material, held at room temperature, becomes a very viscous liquid in 7 days and, held at 70° C., becomes a soft solid in 39 hours A procedure is carried out that is the same as that given in the first paragraph of the example except that the metallic drier is not added to the charge and, in still another procedure, the monomer is used alone. After 7 days at room temperature the resulting materials are limpid liquids, and after 39 hours at 70° C. the materials are viscous liquids.

Other vinyl compounds may be polymerized in the same manner, and changes in the type of cobalt drier (i. e., soluble cobalt salt hereinbefore described), in the type of metal used in the drier, or in the type of organic hydroperoxide in the catalyst combination cause variations in catalytic behavior similar to those demonstrated in Examples 1 and 2 and alter the rate of polymerization correspondingly.

EXAMPLE 7

An organic hydroperoxide-metallic drier catalyst combination is used for the polymerization of an allyl compound, for example, diallyl phthalate monomer. A procedure is carried out that is the same as that given in the first paragraph of Example 3 except that the monomer is diallyl phthalate instead of methyl methacrylate. The material, held at 70° C., polymerizes to a gel in 3 days.

A procedure is carried out that is the same as that given in the first paragraph of Example 3 except that the metallic drier is not added to the charge and, in still another procedure, the monomer is used alone. The resulting materials, held at 70° C., show no change in 3 days.

EXAMPLE 8

A procedure is carried out that is the same as that given in the first paragraph of Example 7 except that the cobalt salt used is cobalt acetylacetonate instead of cobalt naphthenate, and the extent of polymerization is determined by the increase in viscosity. After 5 days at room temperature the resulting material has a viscosity of 71.6 seconds (efflux time) according to a standard Ostwald viscometer for hydrocarbon oils.

A procedure is carried out that is the same as that given in the first paragraph of the example except that the metallic drier is not added to the charge. After 5 days at room temperature the resulting material has a viscosity of 54.8 seconds (efflux time) according to the Ostwald viscometer. Apparently a very small amount of polymerization takes place in this length of time. If the same procedure is repeated except that the monomer is used alone, and if in still another procedure the monomer is used with an amount of organic peroxide (benzoyl peroxide) equal to 2 per cent of the monomer, after 5 days at room temperature the monomer alone has a viscosity of 51.5 seconds (efflux time) and the monomer with the organic peroxide has a viscosity of 56.2 seconds (efflux time) according to the Ostwald viscometer.

Other allyl compounds may be polymerized in the same manner, and changes in the type of cobalt drier (i. e., soluble cobalt salt hereinbefore described), in the type of metal used in the drier, or in the type of organic hydroperoxide in the catalyst combination cause variations in catalytic behavior similar to those demonstrated in Examples 1 and 2 and alter the rate of polymerization correspondingly.

Having described the invention, I claim:

1. A method of controlling the polymerization of a polymerizable composition comprising 70 parts of a polymerizable unsaturated diethylene glycol-maleate resin and 30 parts of diallyl phthalate and, as a polymerization inhibitor, 0.014 part of hydroquinone, characterized by carrying out the polymerization of the composition in the presence of 1 part of 1-hydroxy-cyclohexyl-hydro-peroxide-1 and cobalt naphthenate in such an amount that the cobalt equals 0.012 part.

2. A resinous composition capable of curing in 1½ to 10 hours at room temperature, comprising a copolymerizable mixture of a polymerizable alpha, beta-unsaturated alkyd resin and a polymerizable substance having the $CH_2=C$ group and having a boiling point above 60° C., 1-hydroxy cyclohexyl hydroperoxide-1 present in an amount from 0.10 to 5 per cent based on the weight of copolymerizable resin, and a metal salt drier present in an amount of from 0.004 to 0.01 per cent metal based on the weight of copolymerizable resin.

3. A resinous composition capable of curing in 1½ to 10 hours at room temperature comprising an alpha, beta-unsaturated alkyd resin and styrene, 1-hydroxy cyclohexyl hydroperoxide-1 present in an amount from 0.10 to 5 per cent based on the weight of copolymerizable resin, and cobalt naphthenate present in an amount of from 0.004 to 0.01 per cent cobalt based on the weight of copolymerizable resin.

4. A hard, cured resinous composition comprising a polyester resin, 1-hydroxy cyclohexyl hydroperoxide-1 present in an amount from 0.10 to 5 per cent based on the weight of copolymerizable resin, and cobalt naphthenate present in an amount of from 0.004 to 0.01 per cent cobalt based on the weight of copolymerizable resin.

5. A method of controlling the polymerization of a polymerizable composition comprising a polymerizable unsaturated polyhydric alcohol-polycarboxylic acid polyester, characterized by (1) carrying out initial polymerization in the presence of, as a catalyst, (a) 1-hydroxy-cyclohexyl-hydroperoxide-1, (b) a metallic salt drier of the class consisting of cobalt, manganese, copper, iron, chromium, calcium, nickel and lead driers that is soluble in said polymerizable composition, and (c) a substance of the class consisting of organic peroxides and organic ozonides, at a temperature at which said substance (c) has substantially no catalytic effect, and (2) raising the temperature to render said substance (c) effective to complete the polymerization, substance (a) and substance (b) being present in a weight ratio in the range from 1000:1 to 10:1.

6. A method as claimed in claim 5 in which the substance (c) is benzoyl peroxide.

HAROLD A. HOPPENS.

References Cited in the file of this patent

UNITED STATES PATENTS

| Number | Name | Date |
| --- | --- | --- |
| 1,935,733 | Tschunkur et al. | Nov. 21, 1933 |
| 2,280,242 | Kropa et al. | Apr. 21, 1942 |
| 2,333,635 | Britton et al. | Nov. 9, 1943 |
| 2,380,617 | Stewart et al. | July 31, 1945 |
| 2,409,633 | Kropa et al. | Oct. 22, 1946 |
| 2,430,590 | Stewart | Nov. 11, 1947 |
| 2,467,526 | Harris | Apr. 19, 1949 |
| 2,467,527 | Harris | Apr. 19, 1949 |
| 2,472,963 | Singleton et al. | June 14, 1949 |
| 2,476,936 | Whetstone | July 19, 1949 |
| 2,516,309 | Frazer | July 25, 1950 |
| 2,537,375 | Simons et al. | Jan. 9, 1951 |